United States Patent
Zhan et al.

(10) Patent No.: US 9,025,002 B2
(45) Date of Patent: May 5, 2015

(54) METHOD AND APPARATUS FOR PLAYING AUDIO OF ATTENDANT AT REMOTE END AND REMOTE VIDEO CONFERENCE SYSTEM

(71) Applicant: Huawei Device Co., Ltd., Shenzhen (CN)

(72) Inventors: Wuzhou Zhan, Shenzhen (CN); Dongqi Wang, Shenzhen (CN)

(73) Assignee: Huawei Device Co., Ltd., Shenzhen, Guangdong (CN)

( * ) Notice: Subject to any disclaimer, the term of this patent is extended or adjusted under 35 U.S.C. 154(b) by 251 days.

(21) Appl. No.: 13/711,239

(22) Filed: Dec. 11, 2012

(65) Prior Publication Data
US 2013/0100236 A1    Apr. 25, 2013

Related U.S. Application Data

(63) Continuation of application No. PCT/CN2011/074835, filed on May 30, 2011.

(30) Foreign Application Priority Data

Jun. 11, 2010   (CN) .......................... 2010 1 0205022

(51) Int. Cl.
| H04N 7/14 | (2006.01) |
| H04N 7/15 | (2006.01) |
| H04M 3/56 | (2006.01) |

(52) U.S. Cl.
CPC ................. *H04N 7/15* (2013.01); *H04M 3/567* (2013.01); *H04N 7/142* (2013.01)

(58) Field of Classification Search
CPC ......... H04N 7/15; H04N 7/147; H04N 7/152; H04N 7/141; H04N 7/142
USPC ................................. 348/14.01, 14.08, 14.16
See application file for complete search history.

(56) References Cited

U.S. PATENT DOCUMENTS

| 5,548,346 A | 8/1996 | Mimura et al. |
| 2004/0125241 A1 | 7/2004 | Ogata |

(Continued)

FOREIGN PATENT DOCUMENTS

| CN | 1498035 A | 5/2004 |
| CN | 1984310 A | 6/2007 |

(Continued)

OTHER PUBLICATIONS

Written Opinion of the International Searching Authority issued in corresponding PCT Patent Application No. PCT/CN2011/074835, mailed Sep. 8, 2011.

(Continued)

*Primary Examiner* — Quoc D Tran
(74) *Attorney, Agent, or Firm* — Brinks Gilson & Lione (57) ABSTRACT

A method and an apparatus for playing audio of an attendant at a remote end and a remote video conference system are provided. The method includes: receiving audio of an attendant at a remote site; and by means of two or more loudspeakers mounted at a top and a bottom of a remote image presentation device at a local site, simulating an audio transmission path of the audio of the attendant at the remote site between the two or more loudspeakers and an attendant at the local site through a predetermined algorithm, where the simulating means that the audio transmission path is simulated between an image of the head of the attendant at the remote site displayed in the remote image presentation device, and the head of the attendant at the local site.

13 Claims, 10 Drawing Sheets

(56) References Cited

U.S. PATENT DOCUMENTS

| | | | |
|---|---|---|---|
| 2006/0244817 A1* | 11/2006 | Harville et al. | 348/14.08 |
| 2007/0182865 A1 | 8/2007 | Lomba et al. | |
| 2007/0263079 A1 | 11/2007 | Graham et al. | |
| 2008/0285771 A1* | 11/2008 | Tanaka et al. | 381/92 |
| 2010/0098258 A1* | 4/2010 | Thorn | 381/1 |
| 2010/0119092 A1* | 5/2010 | Kim et al. | 381/306 |
| 2010/0165071 A1 | 7/2010 | Ishibashi et al. | |
| 2010/0215164 A1 | 8/2010 | Sandgren et al. | |
| 2012/0033030 A1 | 2/2012 | Liu et al. | |

FOREIGN PATENT DOCUMENTS

| | | |
|---|---|---|
| CN | 101268715 A | 9/2008 |
| CN | 101534413 A | 9/2009 |
| CN | 101682810 A | 3/2010 |
| CN | 101690149 A | 3/2010 |
| EP | 1763241 A2 | 3/2007 |
| JP | 2007274061 A | 10/2007 |

OTHER PUBLICATIONS

International Search Report issued in corresponding PCT Patent Application No. PCT/CN2011/074835, mailed Sep. 8, 2011.

Office Action issued in corresponding Chinese Patent Application No. 201010205022.3, mailed Aug. 31, 2012.

Office Action issued in corresponding Chinese Patent Application No. 201010205022.3, mailed May 10, 2013, 16 pages.

* cited by examiner

METHOD AND APPARATUS FOR PLAYING AUDIO OF ATTENDANT AT REMOTE END AND REMOTE VIDEO CONFERENCE SYSTEM

CROSS-REFERENCE TO RELATED APPLICATIONS

This application is a continuation of International Application No. PCT/CN2011/074835, filed on May 30, 2011, which claims priority to Chinese Patent Application No. 201010205022.3, filed on Jun. 11, 2010, all of which are hereby incorporated by reference in their entireties.

FIELD OF THE INVENTION

The present invention relates to the field of network communications technologies, and in particular to a method and an apparatus for playing audio of an attendant at a remote end and a remote video conference system.

BACKGROUND OF THE INVENTION

Telepresence is a remote presentation solution that achieves a face-to-face communication effect by providing a life-size image, high-definition video, stereo audio, and a specific design environment. Telepresence can not only implement remote communication, but also reproduce reality, provide virtual reality face-to-face conference experience, and make attendants in different environments feel in a same room. The telepresence system includes not only the network device and terminal device, but also office appliances such as tables and chairs to form a complete telepresence conference room that provides face-to-face conference experience.

Figure 1:
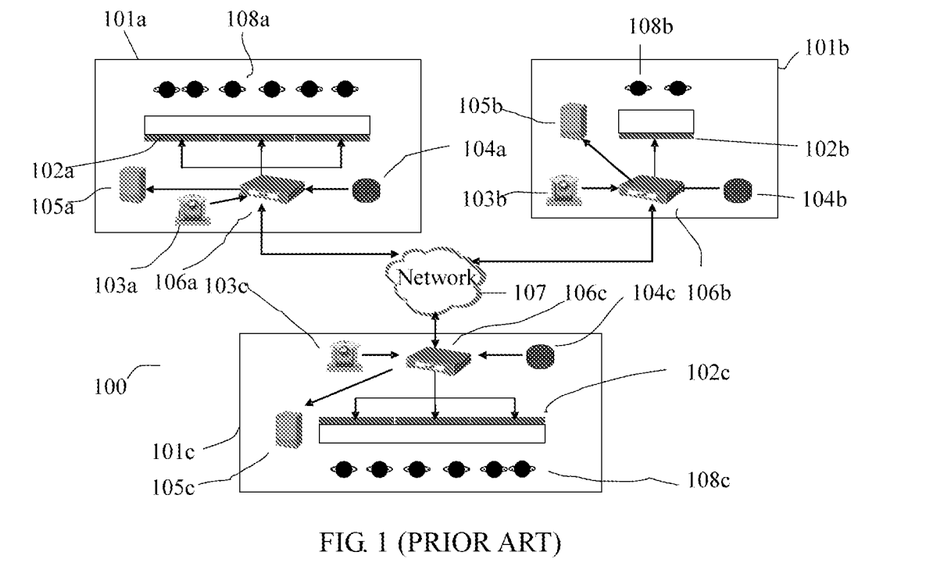
FIG. 1 is a schematic structural diagram of a telepresence system according to the prior art.
Figure 2:
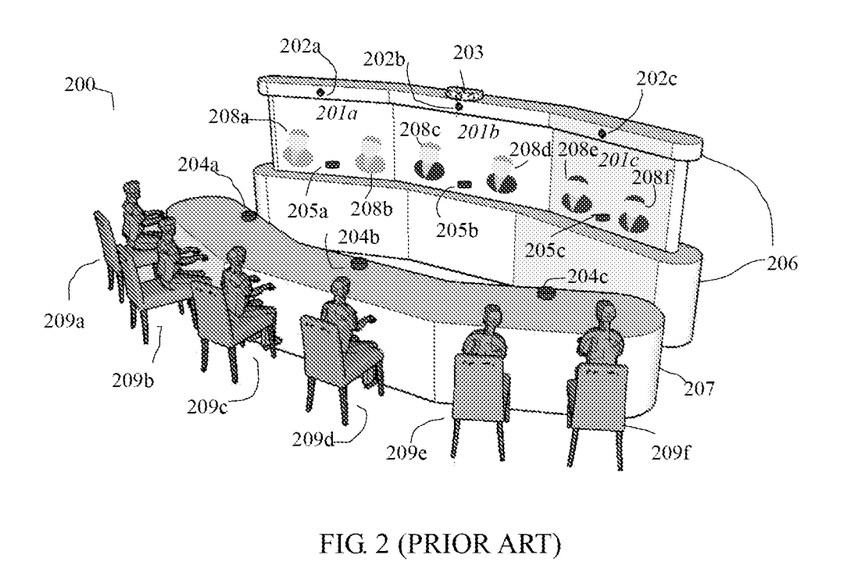
FIG. 2 is a schematic diagram of a conference room layout in a telepresence system according to the prior art.

FIG. 1 shows a telepresence system according to the prior art. Sites at three different positions in the system implement a telepresence conference through network communication. Attendants at a local site obtain video and audio information about attendants at remote sites through the display device 102 and loudspeaker device 105 of the telepresence system. The attendants at the local site also transport video and audio of the attendants at the local site over the network to remote sites through the camera device 103 and microphone device 104 of the telepresence system. FIG. 2 is a schematic diagram of conference room layout of the telepresence system according to the prior art. The attendants at the local site obtain video and audio information about attendants at remote sites through the remote image presentation device 201 and loudspeaker 202 of the telepresence system. The attendants at the local site also transport video and audio of the attendants at the local site over the network to remote sites through the camera 203 and microphone 204 of the telepresence system.

Figure 3:
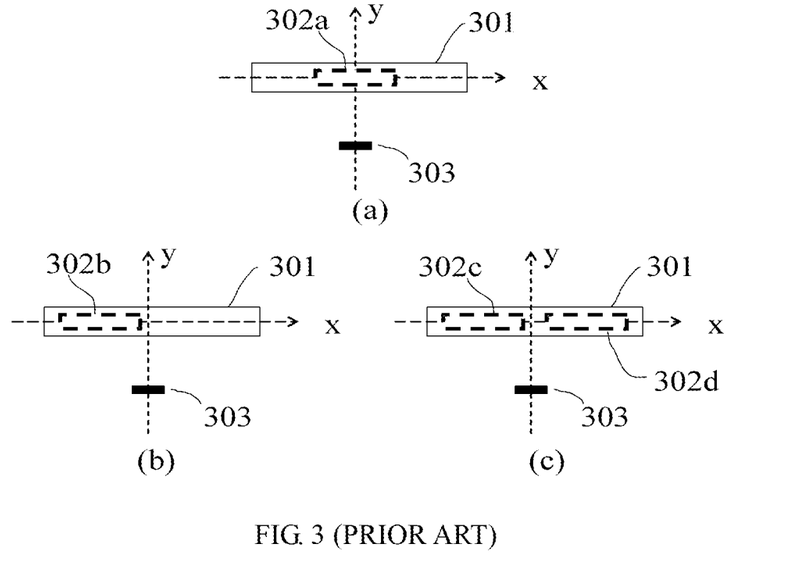
FIG. 3 is an internal schematic structural diagram of a remote image presentation device and a loudspeaker according to the prior art.
Figure 4:
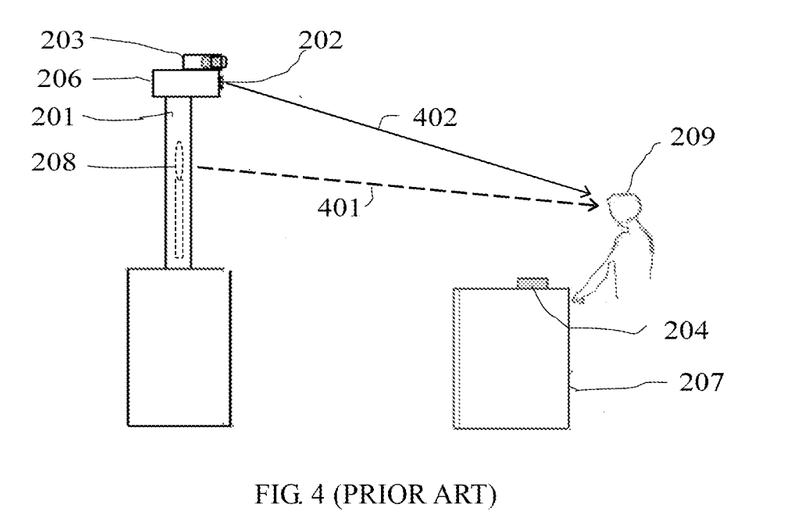
FIG. 4 is a schematic diagram of an audio transmission path between image audio and attendant in an existing telepresence system.

FIG. 3 shows several units in the internal structures of the remote image presentation device 301 and loudspeaker 302. In the scenario as shown in FIG. 3(a), when both image 302 and loudspeaker 303 are located at axis y, the attendants at the local site sense that the voices made by image 302 and loudspeaker 303 match well. In the scenarios as shown in FIG. 3(b) and FIG. 3(c), however, the attendants at the local site sense that the voices made by image 302 and loudspeaker 303 produce a position difference in the horizontal direction. In the scenario as shown in FIG. 4, path 401 corresponds to the path among the heads of the attendants at remote sites displayed by the remote image presentation device 201, and path 402 corresponds to the path of the voice transported from the loudspeaker 202 to the ears of the attendants at the local site.

The difference between the two paths is the position difference in the vertical direction between the voice made from the images of the attendants at the remote sites as seen by the attendants at the local site and the voice actually heard.

During the implementation of the present invention, the inventor discovers at least the following disadvantages in the prior art:

In the existing telepresence system, when attendants at the local site are in a video conference with attendants at remote sites, they feel position differences in the horizontal direction and vertical direction between the voice of attendants at remote sites displayed at the remote image presentation device and the image actually seen.

SUMMARY OF THE INVENTION

Embodiments of the present invention provide a method and an apparatus for playing audio of an attendant at a remote end, and a remote video conference system so that attendants at a local site may accurately feel the positions in the horizontal direction and vertical direction between the voice of attendants at remote sites displayed at the remote image presentation device and the image actually seen when they are in a video conference with the attendants at the remote sites.

A method for playing audio of an attendant at a remote end includes:

receiving audio of an attendant at a remote site; and by means of two or more loudspeakers mounted at a top and a bottom of a remote image presentation device at a local site, simulating an audio transmission path of the audio of the attendant at the remote site between the two or more loudspeakers and an attendant at the local site through a predetermined algorithm, where the simulating means that the audio transmission path is simulated between an image of the head of the attendant at the remote site displayed in the remote image presentation device and the head of the attendant at the local site An apparatus for playing audio of an attendant at a remote end includes:

an audio acquiring unit, configured to receive audio of an attendant at a remote site; and a sound source simulating unit, configured to: by means of two or more loudspeakers mounted at a top and a bottom of a remote image presentation device at a local site, simulate an audio transmission path of the audio of the attendant at the remote site between the two or more loudspeakers and an attendant at the local site through a predetermined algorithm, where the simulating means that the audio transmission path is simulated between an image of the head of the attendant at the remote site displayed in the remote image presentation device and the head of the attendant at the local site, and audio signals of attendants at different locations are played according to corresponding signal strength.

A remote video conference system includes a video/audio collecting device and a video/audio playing device, where the video/audio collecting device includes:

an audio signal encoding unit, configured to select, encode, and send an audio signal that is greater than a threshold from received audio signals;

the video/audio playing device includes:

an audio acquiring unit, configured to receive audio of an attendant at a remote site; and a sound source simulating unit, configured to: by means of two or more loudspeakers mounted at a top and a bottom of a remote image presentation device at a local site, simulate an audio transmission path of the audio of the attendant at the remote site between the two or more loudspeakers and an attendant at the local site through a predetermined algorithm, where the simulating means that the audio transmission path is simulated between an image of the head of the attendant at the remote site displayed in the remote image presentation device and the head of the attendant at the local site, and audio signals of attendants at different locations are played according to corresponding signal strength.

From the technical solutions provided in the embodiments of the present invention, it may be seen that, by simulating the audio transmission path between two or more loudspeakers mounted at the top and bottom of the remote image presentation device at the local site and the attendant at the local site through a predetermined algorithm, the attendant at the local site may accurately feel the positions in the horizontal direction and vertical direction between the voice of attendants at remote sites displayed at the remote image presentation device and the image actually seen in a video conference with the attendant at the remote site.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following description merely show some embodiments of the present invention, and persons of ordinary skill in the art can derive other drawings from the accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 5:
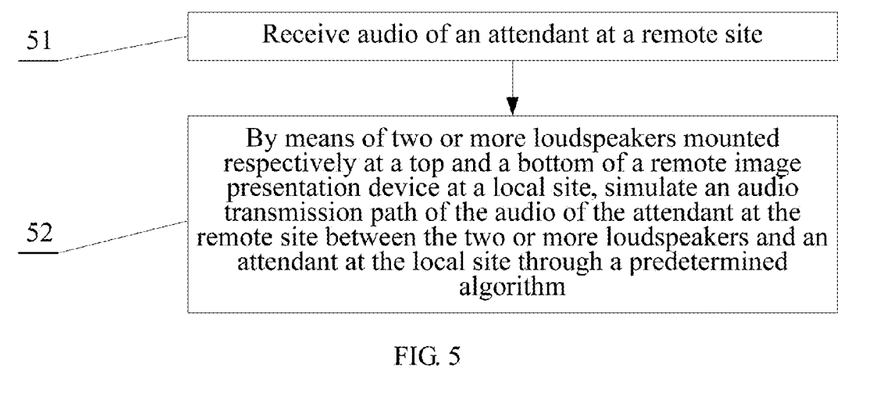
FIG. 5 is a schematic flow chart of a method for playing audio of an attendant at a remote end according to an embodiment of the present invention.

An embodiment of the present invention provides a method for playing audio of an attendant at a remote end, as shown in FIG. 5. The method may specifically include:

Step 51: Receive audio of an attendant at a remote site.

In the received audio of the attendant at the remote site, position information about the attendant is included, which is used to differentiate a position relationship between the attendant and a row parallel to a remote image presentation device. Each channel of audio signal corresponds to a row position of the speaker.

Step 52: According to the position information included in the audio, by means of two or more loudspeakers mounted at a top and a bottom of a remote image presentation device at a local site, simulate an audio transmission path of the audio of the attendant at the remote site between the two or more loudspeakers and an attendant at the local site through a predetermined algorithm, where the simulating means that the audio transmission path is simulated between an image of the head of the attendant at the remote site displayed in remote image presentation device and the head of the attendant at the local site. In this embodiment, the simulating an audio transmission path between an image of the head of the attendant at the remote site displayed in the remote image presentation device and the head of the attendant at the local site specifically includes: if a shortest distance of an image of the attendant at the remote site displayed in the remote image presentation device from the loudspeakers is less than a threshold, playing the audio of the attendant at the remote site in a vertical loudspeaker pair with the shortest distance from the image; otherwise, playing the audio of the attendant at the remote site in multiple vertical loudspeaker pairs with the shortest distances from the image.

According to this embodiment, by simulating the audio transmission path between two or more loudspeakers mounted at the top and bottom of the remote image presentation device at the local site and the attendant at the local site through a predetermined algorithm, while the audio quality of the video conference for the attendant at the local site and attendant at the remote site may be ensured, the attendant at the local site may accurately feel the positions in the horizontal direction and vertical direction between the voice of attendants at remote sites displayed at the remote image presentation device and the image actually seen in a video conference with the attendant at the remote site.

Figure 6:
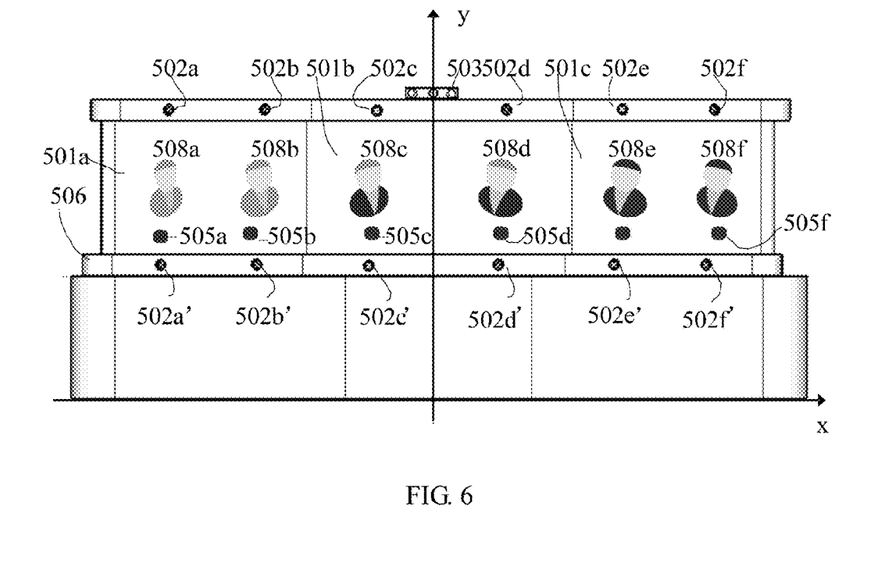
FIG. 6 is a schematic diagram of a layout of two top and bottom loudspeakers corresponding to an image of an attendant at each remote site on a remote image presentation device according to an embodiment of the present invention.

FIG. 6 shows a layout of top and bottom loudspeakers corresponding to an image of an attendant at each remote site on a remote image presentation device according to an embodiment of the present invention. The two loudspeakers are mounted at the top and bottom of the remote image presentation device 501. For example, in a telepresence system that is suitable for six attendants, each group is configured with six loudspeakers. Six loudspeakers, that is, 502a to 502f, are distributed at the top of the remote image presentation device 501. Six loudspeakers, that is, 502a' to 502f', are distributed at the bottom of the remote image presentation device 501. These two rows of loudspeakers are mounted in parallel.

Figure 7:
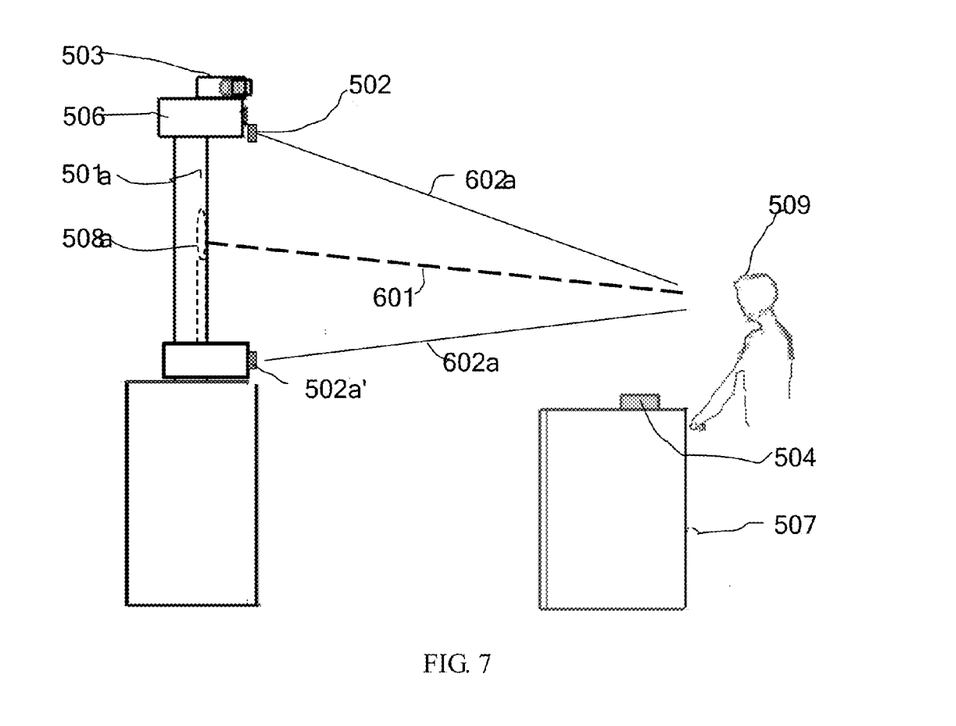
FIG. 7 is a schematic diagram of a sound transmission path between a remote image presentation device and a local attendant according to an embodiment of the present invention.

Among the 12 loudspeakers, according to this embodiment, two loudspeakers with the same coordinates at the X axis vertical to the horizon are called a vertical loudspeaker pair. For example, 502a and 502a' are a vertical loudspeaker pair. The audio signal of attendant 508a at the remote site will be played in the loudspeakers 502a and 502a'. As shown in FIG. 7, the vertical loudspeaker pair may be used to simulate the audio transmission path between the image of the head of the attendant at the remote site displayed in the remote image presentation device, and the head of the attendant at the local site, so that the attendant at the local site feels that the sound of attendant 508a at the remote site comes from the head position. In FIG. 7, path 601 corresponds to the audio transmission path of the sound made from the head of the image for remote attendant 508a in the remote image presentation device 501a to the ears of local attendant 509, path 602a corresponds to the audio transmission path of the sound from upper-row loudspeaker 502a to the ears of local attendant 509, and path 602a' corresponds to the audio transmission path of the sound from lower-row loudspeaker 502a' to the ears of local attendant 509. Through a synthesis algorithm for simulating a sound source, for example, the VBAP (vector base amplitude panning, vector base amplitude panning) method, loudspeakers 502a and 502a' may be used to simulate the sound at the head position of the remote attendant in the image, thereby achieving the purpose that the position of the speech by the remote attendant in the vertical direction is consistent with the position sensed by the user at the local site in the vertical direction.

Further, for received audio signal, a threshold may be used to filter the audio signals. For example, during speech of an attendant, certain sound irrelevant to the conference content is produced as the microphone is tapped or the speech note is turned. Audio signals are thereby produced and received. The strength of these audio signals, however, is weak compared with the strength of the audio signals produced during speech of the attendant. Therefore, a threshold may be set to rule out noises irrelevant to the conference content, and only the voice of the attendant is reserved.

In addition, the number of attendants at the remote site is inconsistent with the number of loudspeakers. For example, in the case of five attendants, one attendant will be arranged between two pairs of vertical loudspeakers (502a and 502a', and 502b and 502b'). In this case, the sound of the attendant will be collected by two microphones at the remote site, and two channels of audio signals are obtained. At the local site, the method according to this embodiment may be used. Through a synthesis algorithm for simulating a sound source, two channels of audio signals are played in two pairs of vertical loudspeakers (502a and 502a', and 502b and 502b'), that is the loudspeakers 502a and 502a' and loudspeakers 502b and 502b' are used to simulate the sound at the head position of the remote attendant in the image, thereby also achieving the purpose that the position of the speech by the remote attendant in the vertical direction is consistent with the position sensed by the user at the local site in the vertical direction.

Figure 8:
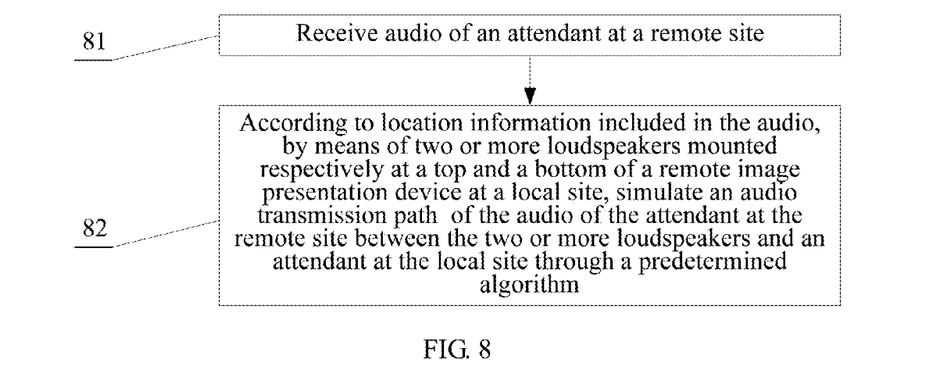
FIG. 8 is a schematic flow chart of a method for simulating a position of a sound source proposed for a configuration scenario of two or more rows of attendants according to an embodiment of the present invention.

This embodiment further proposes a method for playing audio of an attendant at a remote end for a configuration scenario of two or more rows of attendants, as shown in FIG. 8, which may specifically include:

Step 81: Receive audio of an attendant at a remote site.

In the received audio of the attendant at the remote site, in addition to position information about the attendant, location information of the attendant is further included. The location information is used to differentiate a position relationship between the attendant and a remote image presentation device in the vertical direction (that is, front/back row information). Each channel of audio signal corresponds to a position of the speaker.

Step 82: According to the location information included in the audio, by means of two or more loudspeakers mounted at a top and a bottom of a remote image presentation device at a local site, simulate an audio transmission path of the audio of the attendant at the remote site between the two or more loudspeakers and an attendant at the local site through a predetermined algorithm.

The simulating means that the audio transmission path is simulated between an image of the head of the attendant at the remote site displayed in the remote image presentation device, and the head of the attendant at the local site, and audio signals of attendants at different locations are played according to corresponding signal strength.

Figure 9:
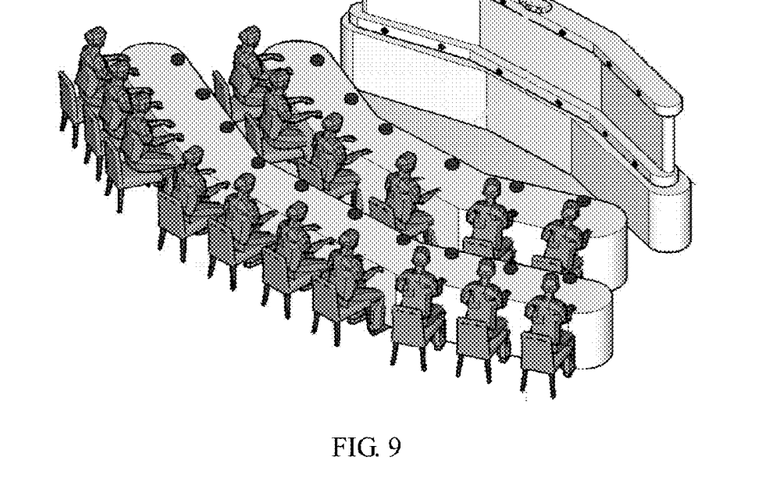
FIG. 9 is a schematic diagram of coaxial configuration in a telepresence system of two rows of attendants according to an embodiment of the present invention.
Figure 10:
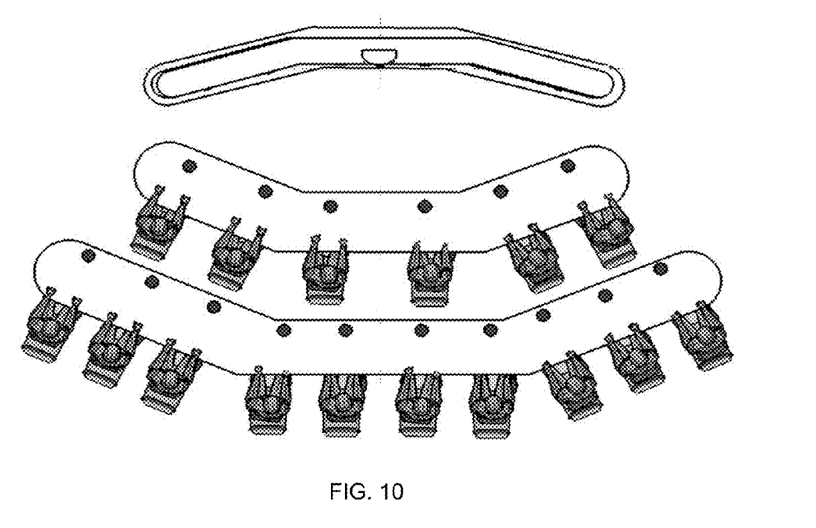
FIG. 10 is a vertical view of attendant configuration in a telepresence system of two rows of attendants according to an embodiment of the present invention.

FIG. 9 shows a coaxial configuration scenario in a telepresence system of two rows of attendants, and FIG. 10 is a vertical view of attendant configuration in a telepresence system of two rows of attendants. When the two rows of telepresence systems transport location information about sound source signals, or may deduce location information about sound source signals, they further transport distance information about the sound source signals or may deduce distance information about the sound source signals to the remote site. As sound transfer generates energy loss, the intensity change of the sound is in direct proportion to the square of the transmission distance (the inverse square law). Therefore, when an attendant in a back row speaks, the amplitude of the signal corresponding to the attendant at the back row may be properly adjusted so that the attendant at the local site may sense the distance to the attendant in the back row.

Figure 11:
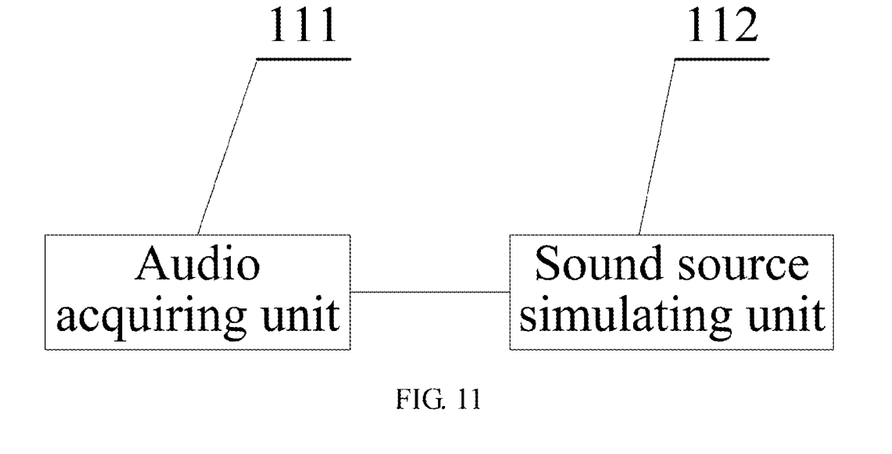
FIG. 11 is a schematic structural diagram of an apparatus for playing audio of an attendant at a remote end according to an embodiment of the present invention.

An embodiment of the present invention further provides an apparatus for playing audio of an attendant at a remote end, as shown in FIG. 11, which may specifically include an audio acquiring unit 111, and a sound source simulating unit 112. The audio acquiring unit 111 is configured to receive audio of an attendant at a remote site; and the sound source simulating unit 112 is configured to: by means of two or more loudspeakers mounted at the top and bottom of the remote image presentation device at the local site, simulate an audio transmission path of the audio of the attendant at the remote site received by the audio acquiring unit 111 between the two or more loudspeakers and the attendant at the local site through a predetermined algorithm. The simulating means that the audio transmission path is simulated between an image of the head of the attendant at the remote site displayed in the remote image presentation device, and the head of the attendant at the local site, and audio signals of attendants at different locations are played according to corresponding signal strength.

Further, in the audio acquiring unit 111, a threshold judging unit may be specifically included, which is configured to reserve audio signals that are greater than a threshold among received audio signals, and send them to the sound source simulating unit 112. The sound source simulating unit 112 may specifically include: if a shortest distance of an image of the attendant at the remote site displayed in the remote image presentation device from the loudspeakers is less than a threshold, playing the audio of the attendant at the remote site in a vertical loudspeaker pair with the shortest distance from the image; otherwise, playing the audio of the attendant at the remote site in multiple vertical loudspeaker pairs with the shortest distances from the image.

Figure 12:
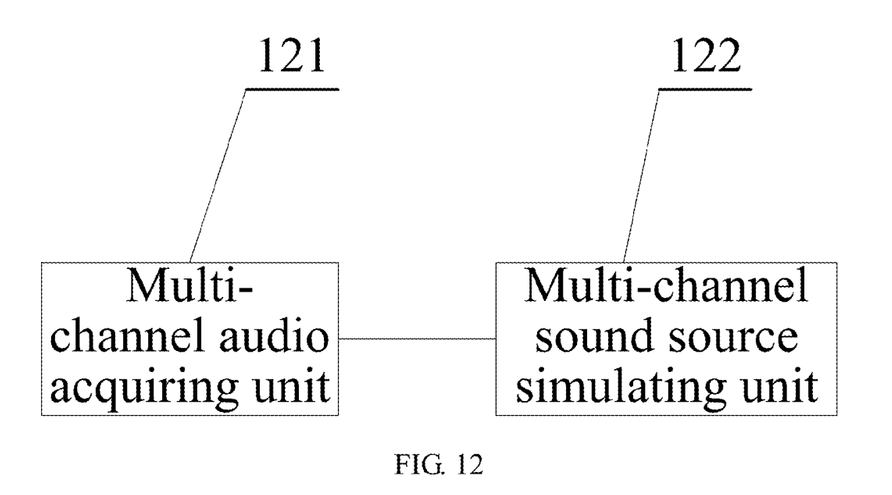
FIG. 12 is a schematic structural diagram of an apparatus for simulating a position of a sound source proposed for a configuration scenario of two or more rows of attendants according to an embodiment of the present invention.

In addition, this embodiment proposes an apparatus for playing audio of an attendant at a remote end for a configuration scenario of two or more rows of attendants, as shown in FIG. 12, which may specifically include a multi-channel audio acquiring unit 121 and a multi-channel sound source simulating unit 122. The multi-channel audio acquiring unit 121 is configured to receive audio of an attendant at a remote site. The multi-channel sound source simulating unit 122, according to the location information included in the audio, by means of two or more loudspeakers mounted at the top and bottom of the remote image presentation device at the local site, simulates an audio transmission path of the audio of the attendant at the remote site between the two or more loudspeakers and the attendant at the local site through a predetermined algorithm. The simulating means that the audio transmission path is simulated between an image of the head of the attendant at the remote site displayed in the remote image presentation device and the head of the attendant at the local site and audio signals of attendants at different locations are played according to corresponding signal strength.

The specific implementation manner of the processing function of each unit included in the apparatus is already described in the method embodiment, and is not described herein.

Figure 13:
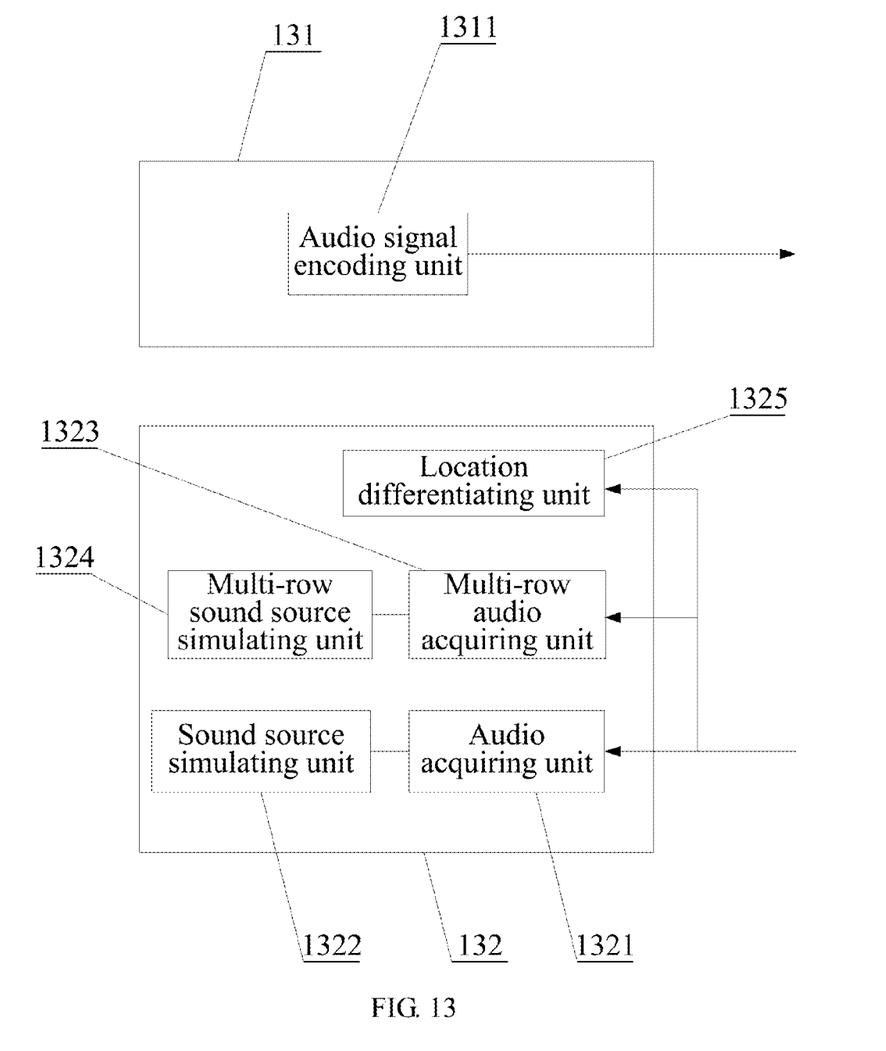
FIG. 13 is a schematic structural diagram of a remote video conference system according to an embodiment of the present invention.

An embodiment of the present invention further provides a remote video conference system, as shown in FIG. 13, which may specifically include a video/audio collecting device 131 and a video/audio playing device 132. The corresponding video/audio collecting device 131 includes an audio signal encoding unit 1311, which is configured to select, encode, and send an audio signal that is greater than a threshold from received audio signals. The corresponding video/audio playing device 132 includes an audio acquiring unit 1321 and a sound source simulating unit 1322. The audio acquiring unit 1321 is configured to receive audio of an attendant at a remote site. The sound source simulating unit 1322 is configured to: by means of two or more loudspeakers mounted at a top and a bottom of a remote image presentation device at a local site, simulate an audio transmission path of the audio of the attendant at the remote site between the two or more loudspeakers and an attendant at the local site through a predetermined algorithm.

Further, the corresponding audio signal encoding unit 1311 further includes encoding received audio signals through a SAOC (Spatial Audio Object Coding, spatial audio object coding) protocol. In addition, the corresponding video/audio playing device 132 may further include a multi-row audio acquiring unit 1323, a multi-row sound source simulating unit 1324, and a location differentiating unit 1325. The multi-row audio acquiring unit 1323 is configured to receive audio of an attendant at a remote site. The multi-row sound source simulating unit 1324 is configured to: by means of the two or more loudspeakers mounted at the top and bottom of the remote image presentation device at the local site, simulate the audio transmission path between the two or more loudspeakers and the attendant at the local site through the predetermined algorithm. The location differentiating unit 1325 is configured to: according to location information about audio signals of attendants at the remote site, play the audio signals of attendants at different locations according to corresponding signal strength.

Figure 14:
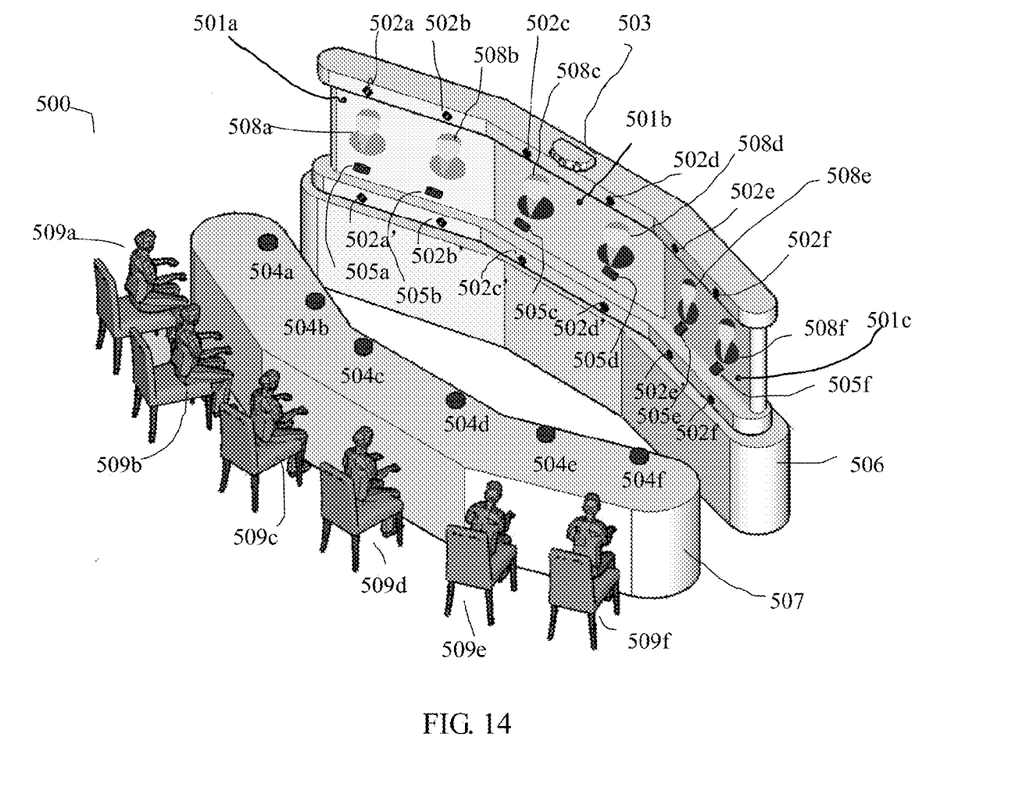
FIG. 14 is a schematic diagram of a site layout of a remote video conference system according to an embodiment of the present invention.

In this embodiment, the remote video conference system may use the site layout as shown in FIG. 14. In the system, a telepresence system 500 at one site includes a remote image presentation device 501, a loudspeaker 502, a camera 503, and a microphone 504. The remote image presentation device 501 presents an image of a remote site. The remote image presentation device 501 provides a remote microphone 505 at the remote site and an attendant 508 at the remote site. A fixed table 506 is configured to fix the remote image presentation device 501, loudspeaker 502, camera 503, and processing devices (not illustrated in the figure) connected to the devices. A site table 507 is provided for an attendant at the local site 509, where a local microphone 504 that is configured to collect sound signals of the local site is placed or embedded.

In the scenario as shown in FIG. 14, a video/audio receiving device at a remote site places a remote microphone 505 right in front of each attendant 508 at a remote site, and the position of the microphone is fixed. When different attendants speak, as the positions of the attendants are different, the signal strength corresponding to different signals collected by each remote microphone 505 is different. As sound transfer generates energy loss, the intensity change of the sound is in proportion to the square of the transmission distance (the rule of square inverse proportion). Therefore, by analyzing the audio signals collected by each remote microphone 505, a remote microphone 505 currently in active state may be judged. Preferably, a fixed threshold may be set. When the signal strength captured by a certain remote microphone 505 is larger than a preset threshold, the signals of the remote microphone 505 are encoded as independent sound source signals. For example, in FIG. 14, when an attendant 508*a* at a remote site speaks, the sound strength collected by the remote microphone 505*a* is obviously larger than the signal strength captured by other five remote microphones. Therefore, the remote microphone 505*a* is determined as the microphone in the active state. Specially, if the attendant 508*a* at the remote site is located between two remote microphones, for example, in the middle of remote microphones 505*a* and 505*b*, the two microphones will be determined as microphones in the active state. In addition, as the position of the remote microphone 505 is fixed, the position of the microphone in active state may be obtained. Therefore, the position information about the microphone or position information about the microphone that may be deduced is also sent to the video/audio playing device at the local site.

After receiving the audio signals and position information about the remote microphone 505 in active state at the peer end, the video/audio playing device at the local site finds a matched loudspeaker pair. For example, when the attendant 508*a* at the remote site speaks at the position as shown in FIG. 14, the matched vertical loudspeaker pair is loudspeakers 502*a* and 502*a*'. In this case, the video/audio playing device may generate loudspeaker signals corresponding to loudspeakers 502*a* and 502*a*' through a VBAP method. When the attendant 508*a* at the remote site is between the remote microphones 505*a* and 505*b*, the matched vertical loudspeaker pairs are loudspeakers 502*a* and 502*a*', and loudspeakers 502*b* and 502*b*'. In this case, the video/audio playing device may generate loudspeaker signals corresponding to loudspeakers 502*a* and 502*a*' based on the signals captured by the local microphone 505a, and generate loudspeaker signals corresponding to loudspeakers 502b and 502b' based on the signals captured by the local microphone 505b through the VBAP method. The sound may be simulated at the correct horizontal position through two vertical loudspeaker pairs, thereby achieving the purpose that the position to the horizontal direction of the speech made by an attendant at a remote site is consistent with the position to the horizontal direction sensed by the user at the local site.

Figure 15:
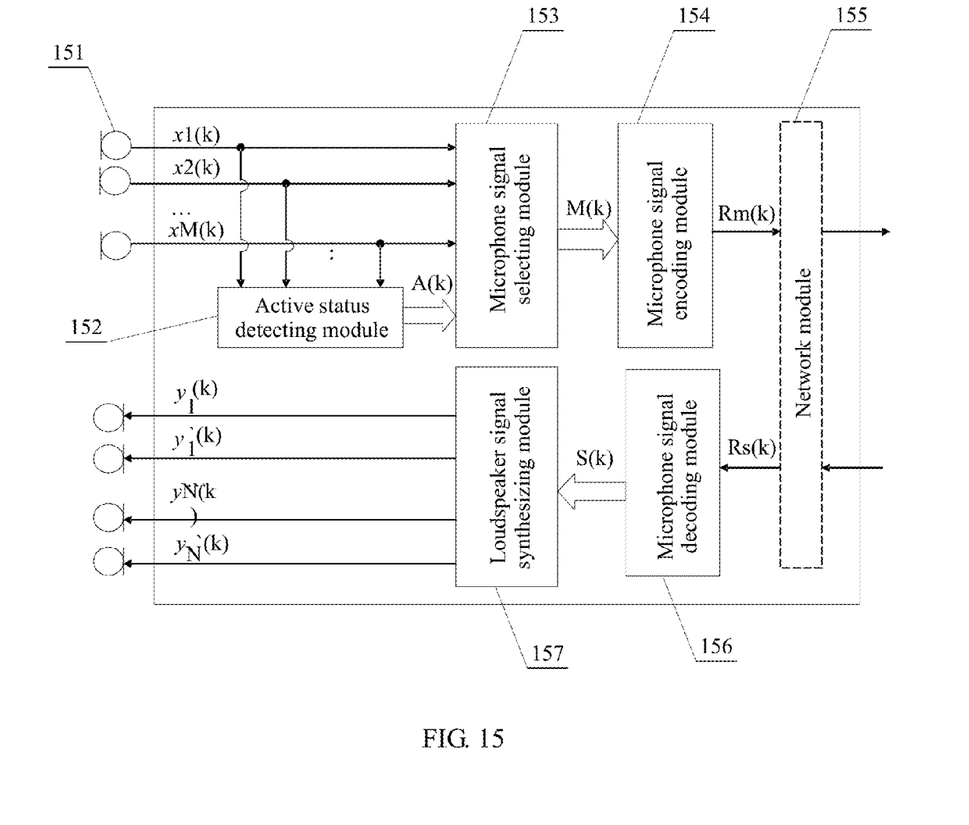
FIG. 15 is a modular diagram of an audio processing system in a video/audio collecting device and a video/audio playing device in a video conference system according to an embodiment of the present invention.

FIG. 15 is a modular diagram of an audio processing system in a video/audio collecting device and a video/audio playing device in a video conference system. The audio signals collected by the remote microphone 151 are converted through AD conversion into digital signals $x_1(k), x_2(k), \ldots, x_M(k)$, where M is a natural number and k denotes a parameter of the digital signal expression. The active state detecting module 152 is configured to detect the active state of each microphone signal, that is, $x_1(k), x_2(k), \ldots, x_M(k)$, and output the microphone signal A(k) in active state to the microphone signal selecting module 153. The microphone signal selecting module 153 sends, according to active A(k) (A(k) denotes all microphone signals in active state, which may be one signal or may be multiple signals) a signal M(k) in active state to the microphone signal encoding module 154 to obtain an encoded signal $R_m(k)$, and then sends the encoded $R_m(k)$ by using the network module 155 to the remote sites via the network. The network module 155 may also be provided by an independent network device.

The network module 155 also receives other encoded signals $R_s(k)$ sent by other remote sites. The microphone signal decoding module 156 decodes $R_s(k)$, to obtain S(k), and transports S(k) to the loudspeaker signal synthesizing module 157. The loudspeaker signal synthesizing module 157 synthesizes signals $y_1(k), y_1'(k), \ldots, y_N(k)$, and $y_N'(k)$ corresponding to all loudspeakers according to S(k), where $y_1(k)$ and $y_1'(k)$ correspond to upper-row loudspeaker signals and lower-row loudspeaker signals of the first vertical loudspeaker pair; and $y_N(k)$ and $y_N'(k)$ correspond to upper-row loudspeaker signals and lower-row loudspeaker signals of the Nth vertical loudspeaker pair.

Figure 16:
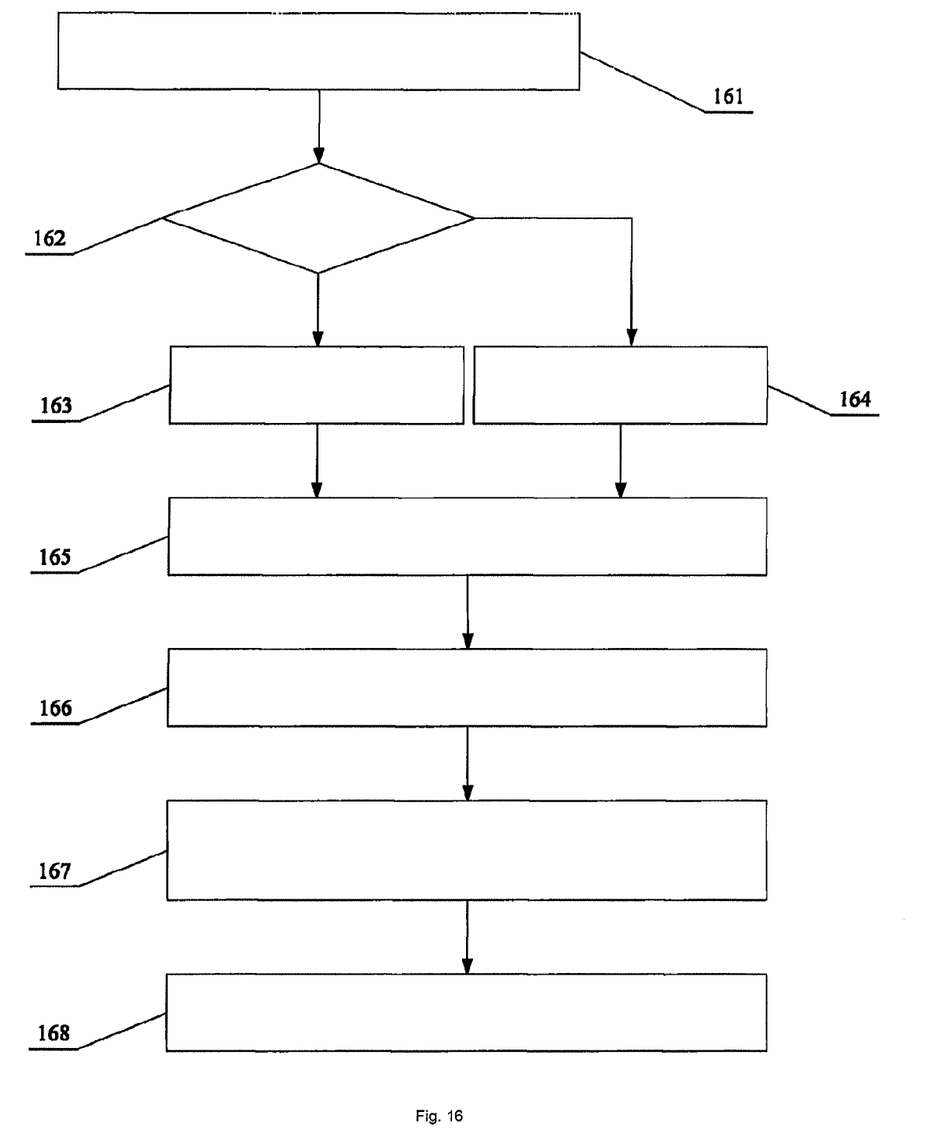
FIG. 16 is a schematic processing flow chart for encoding audio signals via an SAOC protocol according to an embodiment of the present invention.

Further, the microphone signal encoding module 154 in FIG. 15 may be implemented based on the SAOC protocol. The specific solution is shown in FIG. 16, and may include the following steps at the sending end:

Step 161: Collect one or two audio signals, and calculate location information about each sound source.

Step 162: Judge whether encoding of microphone signals supports the SAOC protocol; if yes, perform step 163; if no, perform step 164.

Step 163: Encode each sound source as an object by using the SAOC protocol, and preset multiple groups of reproduction parameters (as the SAOC protocol is an audio encoding algorithm that may efficiently transport multiple speech and instrument signals at the same time, it may be applied to the multitrack scenario).

Step 164: Generate the corresponding number of audio signals according to the number of audio tracks supported by the receiving party.

Step 165: Encode audio signals generated in step 163 or step 164 through an existing encoder.

The following steps may be included at the receiving terminal:

Step 166: Perform decoding by using a corresponding decoder.

Step 167: If the decoded signals support the SAOC protocol, generate multiple audio objects according to the SAOC protocol information, and generate a number of audio signals (where the number is the same as the number of loudspeakers) according to preset reproduction parameters.

Step 168: Send the audio signals to the video/audio playing device for playback.

According to this embodiment, by simulating the audio transmission path between two or more loudspeakers mounted at the top and bottom of the remote image presentation device at the local site and the attendant at the local site through a predetermined algorithm, while the audio quality of the video conference for the attendant at the local site and attendant at the remote site may be ensured, the attendant at the local site may accurately feel the positions in the horizontal direction and vertical direction between the voice of attendants at remote sites displayed at the remote image presentation device and the image actually seen in a video conference with the attendant at the remote site; by means of the SAOC protocol, interworking may be implemented when the numbers of microphones and loudspeakers in the two instant participating parties are different, and the attendant at the local site may still accurately sense the distance when a remote attendant makes a speech in the scenario of multiple rows of attendants.

The sequence numbers of the preceding embodiments of the present invention are merely for description purpose but do not indicate the preference of the embodiments.

Persons skilled in the art may understand clearly that the embodiments of the present invention may be implemented through software and an essential universal hardware platform. Base on such understanding, the technical solutions in the embodiments of the present invention essentially, or the part contributing to the prior art may be implemented in a form of a software product. The computer software product may be stored in a storage medium such as an ROM/RAM, a magnetic disk, or an optical disk, and include several instructions for instructing a computer device (which may be a personal computer, a server, or a network device, and the like) to execute the methods described in the embodiments of the present invention or in some parts of the embodiments of the present invention.

The foregoing embodiments are not intended to limit the present invention. For persons of ordinary skill in the art, any modification, equivalent replacement, and improvement made without departing from the principle of the present invention shall fall within the protection scope of the present invention.

What is claimed is:

1. A method for playing audio of a plurality of a respective remote attendants at one or more remote ends, comprising:
receiving audio signals from at least two respective remote attendants at one or more respective remote site;
using a remote image presentation device to display at a local site, the at least two respective remote attendants as corresponding at least two remote attendant images, wherein for each of the corresponding at least two remote attendant images being displayed on the remote image presentation device at the local site, directly mounting at least one corresponding pair of loudspeakers vertically above and below one respective remote attendant image being displayed, such that the corresponding pair of loudspeakers project audio signals or voice corresponding to only one respective remote attendant at one respective remote site;
simulating through a predetermined algorithm at the local site, a first and a second audio transmission paths, wherein the first audio transmission path corresponds to a first audio transmission traveling a first distance between the head of a first respective remote attendant image displayed in the remote image presentation device to the head of an attendant at the local site, and the second audio transmission path corresponds to a second audio transmission traveling a second distance between the head of a second respective remote attendant image displayed in the remote image presentation device and the head of the same attendant or another attendant at the local site.

2. The method according to claim 1, wherein the first and the second audio transmissions comprise position information or location information, the position information is used to differentiate a position relationship between the attendant at the local site and a horizontal row parallel to the remote image presentation device, and the location information is used to differentiate a position relationship between the attendant and the remote image presentation device at the local site in a vertical direction.

3. The method according to claim 2, wherein the step of directly mounting at least one corresponding pair of loudspeakers vertically above and below one respective remote attendant image being displayed in the image presentation device at a local site, and simulating through a predetermined algorithm at the local site, a first and a second audio transmission paths, comprises:

according to the position information or location information comprised in the first and the second audio transmissions, using the directly mounted at least one corresponding pair of loudspeakers vertically above and below the one respective remote attendant image being displayed in the image presentation device at the local site, respectively, simulating the first and the second audio transmission paths of the audio transmissions traveling between the corresponding pair of loudspeakers and the same attendant or another attendant at the local site through the predetermined algorithm.

4. The method according to claim 1, wherein the step of receiving audio signals from at least two respective remote attendants at the one or more respective remote site, comprises:

reserving audio signals that are greater than a threshold in the received audio signals.

5. The method according to claim 1, wherein the the simulating of the first and the second audio transmission paths at the local site, comprises:

if a shortest distance between the corresponding pair of loudspeakers vertically mounted above and below the one respective remote attendant image and the same attendant or another attendant at the local site is less than a threshold, playing the audio of the one respective remote attendant at the remote site using only the pair of loudspeakers vertically mounted above and below the one respective remote attendant image; otherwise, playing the audio of the one respective remote attendant at the remote site using multiple pairs of loudspeakers including those adjacently mounted to the one respective remote attendant image.

6. An apparatus for playing audio of a plurality of respective remote attendants at one or more remote end, comprising:

an audio acquiring unit, configured to receive audio signals from at least two respective remote attendants at one or more respective; and a sound source simulating unit, configured to:
use a remote image presentation device to display at a local site, the at least two respective remote attendants as corresponding at least two remote attendant images, wherein for each of the corresponding at least two remote attendant images being displayed on the remote image presentation device at the local site, directly mounting at least one corresponding pair of loudspeakers vertically above and below one respective remote attendant image being displayed, such that the corresponding pair of loudspeakers project audio signals or voice corresponding to only one respective remote attendant at one respective remote site;

simulate through a predetermined algorithm at the local site, a first and a second audio transmission paths, wherein the first audio transmission path corresponds to a first audio transmission traveling a first distance between the head of a first respective remote attendant image displayed in the remote image presentation device to the head of an attendant at the local site, and the second audio transmission path corresponds to a second audio transmission traveling a second distance between the head of a second respective remote attendant image displayed in the remote image presentation device and the head of the same attendant or another attendant at the local site, and wherein audio signals of the at least two respective remote attendants are played according to corresponding signal strength.

7. The apparatus according to claim 6, wherein the first and the second audio transmissions comprise position information or location information, the position information is used to differentiate a position relationship between the attendant at the local site and a horizontal row parallel to the remote image presentation device, and the location information is used to differentiate a position relationship between the attendant and the remote image presentation device at the local site in a vertical direction.

8. The apparatus according to claim 7, wherein the sound source simulating unit is further configured to: according to the position information or location information comprised in the first and the second audio transmissions, using the directly mounted at least one corresponding pair of loudspeakers vertically above and below the one respective remote attendant image being displayed in the image presentation device at the local site, respectively, simulate the first and the second audio transmission paths of the audio transmissions traveling between the corresponding pair of loudspeakers and the same attendant or another attendant at the local site through the predetermined algorithm.

9. The apparatus according to claim 6, wherein the audio acquiring unit comprises:

a threshold judging unit, configured to reserve audio signals that are greater than a threshold in the received audio signals.

10. The apparatus according to claim 6, wherein the sound source simulating unit comprises:

a multi-speaker simulating unit, configured to: if a shortest distance between the corresponding pair of loudspeakers vertically mounted above and below the one respective remote attendant image and the same attendant or another attendant at the local site is less than a threshold, playing the audio of the one respective remote attendant at the remote site using only the pair of loudspeakers vertically mounted above and below the one respective remote attendant image; otherwise, playing the audio of the one respective remote attendant at the remote site using multiple pairs of loudspeakers including those adjacently mounted to the one respective remote attendant image.

11. A remote video conference system, comprising a video/audio collecting device and a video/audio playing device, wherein the video/audio collecting device comprises:
   an audio signal encoding unit, configured to select, encode, and send an audio signal that is greater than a threshold from received audio signals;
   the video/audio playing device comprises:
   an audio acquiring unit, configured to receive audio signals from at least two respective remote attendants at one or more respective remote site; and
   a sound source simulating unit, configured to:
      use a remote image presentation device to display at a local site, the at least two respective remote attendants as corresponding at least two remote attendant images, wherein for each of the corresponding at least two remote attendant images being displayed on the remote image presentation device at the local site, directly mounting at least one corresponding pair of loudspeakers vertically above and below one respective remote attendant image being displayed, such that the corresponding pair of loudspeakers project audio signals or voice corresponding to only one respective remote attendant at one respective remote site;
      simulate through a predetermined algorithm at the local site, a first and a second audio transmission paths, wherein the first audio transmission path corresponds to a first audio transmission traveling a first distance between the head of a first respective remote attendant image displayed in the remote image presentation device to the head of an attendant at the local site, and the second audio transmission path corresponds to a second audio transmission traveling a second distance between the head of a second respective remote attendant image displayed in the remote image presentation device and the head of the same attendant or another attendant at the local site, and wherein audio signals of the at least two respective remote attendants are played according to corresponding signal strength.

12. The system according to claim 11, wherein the video/audio playing device further comprises:
   a multi-row audio acquiring unit, configured to receive audio signals from at least two respective remote attendants at one or more respective remote site; and
   a multi-row sound source simulating unit, configured to:
      use a remote image presentation device to display at a local site, the at least two respective remote attendants as corresponding at least two remote attendant images, wherein for each of the corresponding at least two remote attendant images being displayed on the remote image presentation device at the local site, directly mounting at least one corresponding pair of loudspeakers vertically above and below one respective remote attendant image being displayed, such that the corresponding pair of loudspeakers project audio signals or voice corresponding to only one respective remote attendant at one respective remote site;
      simulate through a predetermined algorithm at the local site, a first and a second audio transmission paths, wherein the first audio transmission path corresponds to a first audio transmission traveling a first distance between the head of a first respective remote attendant image displayed in the remote image presentation device to the head of an attendant at the local site, and the second audio transmission path corresponds to a second audio transmission traveling a second distance between the head of a second respective remote attendant image displayed in the remote image presentation device and the head of the same attendant or another attendant at the local site, and wherein audio signals of the at least two respective remote attendants are played according to corresponding signal strength.

13. The system according to claim 12, wherein the video/audio playing device further comprises:
   a location differentiating unit, configured to: if the one respective attendant at the remote site is located between two remote microphones, simulate audio of the one respective attendant at the remote site in two corresponding groups of loudspeaker pairs through the predetermined algorithm.

* * * * *

UNITED STATES PATENT AND TRADEMARK OFFICE
CERTIFICATE OF CORRECTION

PATENT NO.       : 9,025,002 B2                                    Page 1 of 1
APPLICATION NO.  : 13/711239
DATED            : May 5, 2015
INVENTOR(S)      : Wuzhou Zhan et al.

It is certified that error appears in the above-identified patent and that said Letters Patent is hereby corrected as shown below:

In the Claims

In column 11, claim 5, line 42, after "claim 1, wherein" delete "the" (second occurrence).

Signed and Sealed this
Third Day of November, 2015

Michelle K. Lee
*Director of the United States Patent and Trademark Office*